United States Patent
Potter

(10) Patent No.: US 7,983,812 B2
(45) Date of Patent: Jul. 19, 2011

(54) METHOD AND APPARATUS FOR MANAGING BATTERY POWER IN EMERGENCY VEHICLES

(75) Inventor: Scott A. Potter, Rocky Hill, CT (US)

(73) Assignee: Scott Potter & Associates, LLC, Cromwell, CT (US)

( * ) Notice: Subject to any disclaimer, the term of this patent is extended or adjusted under 35 U.S.C. 154(b) by 207 days.

(21) Appl. No.: 12/185,244

(22) Filed: Aug. 4, 2008

(65) Prior Publication Data

US 2010/0030431 A1 Feb. 4, 2010

(51) Int. Cl.
*G06F 7/00* (2006.01)
*H04B 1/16* (2006.01)

(52) U.S. Cl. ...... 701/36; 701/45; 455/343.5; 455/343.6; 340/438

(58) Field of Classification Search ............... 701/45, 701/112, 1, 33, 36; 340/425.5, 433, 434, 340/439, 455, 458, 461, 468, 471, 384.4, 340/571.2, 438, 693.2, 501, 519, 540, 691.8, 340/52 F, 52 R, 52 C, 60, 27, 412, 414, 428, 340/463, 636.1–636.2, 641, 693.1–693.4, 340/7.32, 855.8, FOR. 383; 320/132, 104, 320/106, 135, 109, 139; 455/4.1, 343.1–343.6, 455/573, 574, 127.5, 572
See application file for complete search history.

(56) References Cited

U.S. PATENT DOCUMENTS

| | | | |
|---|---|---|---|
| 4,424,477 A | 1/1984 | Enoshima et al. | |
| 4,527,112 A | 7/1985 | Herman | |
| 4,902,956 A | 2/1990 | Sloan | |
| 5,057,764 A | 10/1991 | Fujimoto et al. | |
| 5,072,703 A * | 12/1991 | Sutton | 123/179.4 |
| 5,130,659 A * | 7/1992 | Sloan | 324/435 |
| 5,307,060 A * | 4/1994 | Prevulsky et al. | 340/902 |
| 5,402,007 A | 3/1995 | Center et al. | |
| 5,563,576 A | 10/1996 | Drori et al. | |
| 5,659,289 A * | 8/1997 | Zonkoski et al. | 340/438 |
| 5,796,179 A * | 8/1998 | Honaga | 307/10.5 |
| 5,831,411 A | 11/1998 | Klauer et al. | |
| 6,274,944 B1 | 8/2001 | Letang | |
| 6,573,614 B2 | 6/2003 | Doll | |
| 6,778,078 B1 | 8/2004 | Han et al. | |
| 6,838,858 B2 | 1/2005 | Berneis et al. | |
| 6,925,985 B2 | 8/2005 | Wagner et al. | |
| 7,003,395 B1 | 2/2006 | Thompson et al. | |
| 7,091,629 B2 | 8/2006 | Hawkins | |
| 7,146,959 B2 | 12/2006 | Thompson et al. | |

(Continued)

FOREIGN PATENT DOCUMENTS

JP 10-047105 * 2/1998

(Continued)

*Primary Examiner* — James P Trammell
*Assistant Examiner* — Muhammad Shafi
(74) *Attorney, Agent, or Firm* — Ronald E. Prass, Jr.; Prass LLP

(57) ABSTRACT

A method and apparatus for battery power management in an emergency vehicle having its engine off and warning lights on is disclosed. The method may include monitoring a voltage level of a battery of the emergency vehicle, determining if the battery voltage level is below a predetermined threshold, wherein if it is determined that the battery voltage level is below the predetermined threshold, automatically starting the emergency vehicle's engine to charge the battery, determining if the emergency vehicle's battery is charged, wherein if it is determined that the emergency vehicle's battery is charged, automatically turning off the emergency vehicle's engine, wherein the monitoring of the battery voltage level is resumed.

18 Claims, 4 Drawing Sheets

U.S. PATENT DOCUMENTS

| | | | |
|---|---|---|---|
| 7,290,517 B2 | 11/2007 | Marchand et al. | |
| 7,347,175 B2 | 3/2008 | Lupo et al. | |
| 2003/0169019 A1* | 9/2003 | Oosaki | 320/132 |
| 2004/0127327 A1* | 7/2004 | Kahlon et al. | 477/5 |
| 2004/0262995 A1* | 12/2004 | Hawkins | 307/10.6 |
| 2006/0126256 A1* | 6/2006 | Forest et al. | 361/139 |
| 2008/0007205 A1 | 1/2008 | Thimm et al. | |

FOREIGN PATENT DOCUMENTS

| | | |
|---|---|---|
| JP | 2006327487 A | 12/2006 |

* cited by examiner

METHOD AND APPARATUS FOR MANAGING BATTERY POWER IN EMERGENCY VEHICLES

BACKGROUND OF THE DISCLOSURE

1. Field of the Disclosure

The disclosure relates to emergency vehicles, and in particular for managing battery power in emergency vehicles.

2. Introduction

Escalating fuel costs are forcing local and state governments to search for ways to reduce vehicle idling or to mandate anti-idling procedures for police and highway officials' vehicles. Extended idling also greatly increases wear and tear on vehicle parts and contributes to harmful greenhouse gas emissions which contribute to climate change and the formation of smog.

Many police and highway officials idle their vehicles while parked which allows the vehicle to maintain enough power to operate the critical warning lights that protect lives. Without the vehicles idling, warning lights would operate solely on the vehicles battery power. Over time, the warning lights will run down the battery causing not only the lights to go off, but also requiring a "jump start" from a second vehicle.

SUMMARY OF THE DISCLOSURE

A method and apparatus for battery power management in an emergency vehicle having its engine off and warning lights on is disclosed. The method may include monitoring a voltage level of a battery of the emergency vehicle, determining if the battery voltage level is below a predetermined threshold, wherein if it is determined that the battery voltage level is below the predetermined threshold, automatically starting the emergency vehicle's engine to charge the battery, determining if the emergency vehicle's battery is charged, wherein if it is determined that the emergency vehicle's battery is charged, automatically turning off the emergency vehicle's engine, wherein the monitoring of the battery voltage level is resumed.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which.

DETAILED DESCRIPTION OF THE DISCLOSURE

Figure 1:
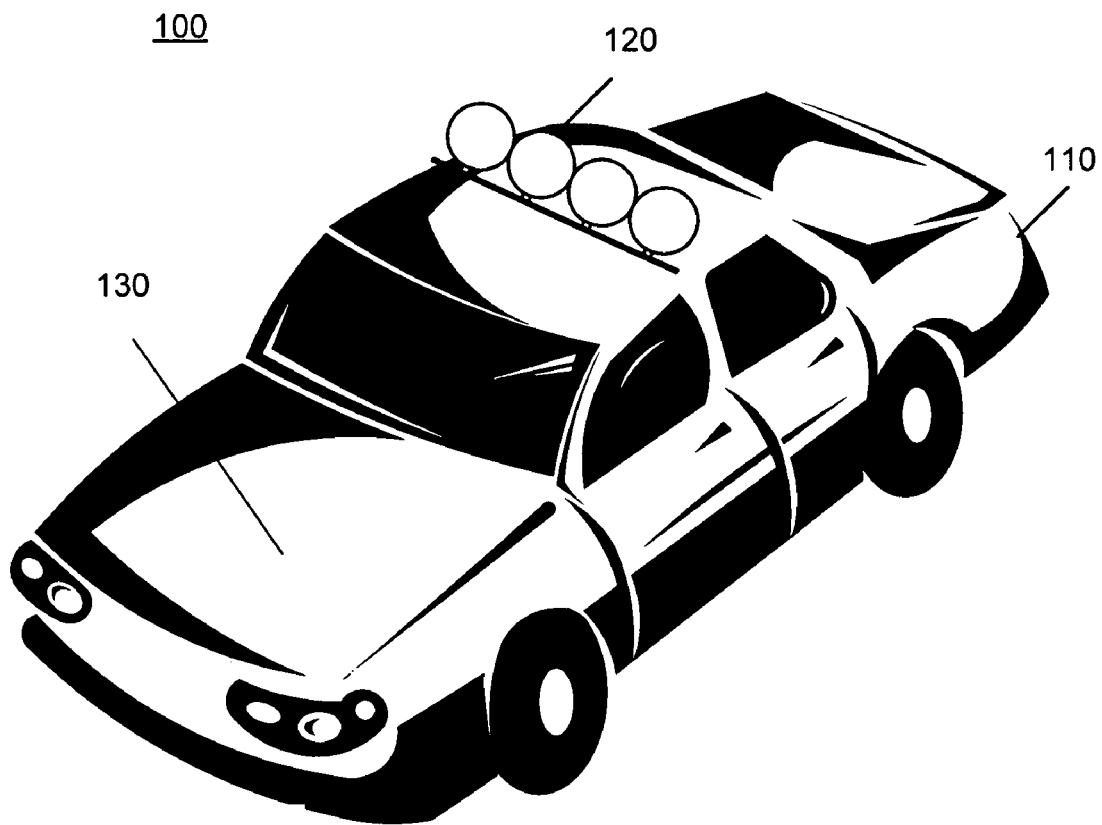
FIG. 1 is an exemplary diagram of an emergency vehicle in accordance with a possible embodiment of the disclosure.

Additional features and advantages of the disclosure will be set forth in the description which follows, and in part will be obvious from the description, or may be learned by practice of the disclosure. The features and advantages of the disclosure may be realized and obtained by means of the instruments and combinations particularly pointed out in the appended claims. These and other features of the present disclosure will become more fully apparent from the following description and appended claims, or may be learned by the practice of the disclosure as set forth herein.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosure comprises a variety of embodiments, such as a method and apparatus and other embodiments that relate to the basic concepts of the disclosure. This disclosure may concern a battery power management unit that may be attached to an emergency vehicle that may have its engine off and warning lights on. The battery power management unit may monitor the vehicles battery voltage level. When the voltage drops to a predetermined level, the monitor may then signal a controller to start the emergency vehicle's engine and operate it for a predetermined amount of time. Once the time expires, the controller may turn the engine off and the process is repeated. The critical warning lights may remain on through the entire cycle. This practice will ensure the engine only idles when it is absolutely necessary to maintain appropriate on board energy levels.

Other features may include:

This battery power management unit may only be enabled when the ignition key is in the "off" or "accessory" position and the warning lights are switched "on". This may prevent unwanted vehicle starts.

The enabling feature may be programmable to be either positive or negative ground) switched to work universally with today's warning light systems.

The battery power management unit may be as universal as possible to accommodate a wide range of vehicle types.

As an upgrade or option, the battery power management unit may automatically adapt to various charging systems. The battery power management unit may monitor the time period between restarts and automatically adjust the engine idle time based on that information.

The battery power management unit may not activate any original equipment manufacturer's (OEM) exterior lights on the vehicle as the purpose of the engine running is to charge the battery. Additional unnecessary lights may compromise the charging process. An optional low current indicator light may advise those outside the vehicle that the system is enabled, and provide visual indication as to what mode the battery power management unit is currently operating in.

If during the engine idle battery charging cycle, pressing the brake pedal may immediately turn the engine off to prevent vehicle theft.

Another safety feature may be that the battery power management unit may not operate if the hood is open to prevent the engine from starting if being worked on.

During the engine idle battery charging cycle, the start position of the emergency vehicle's ignition may be disabled to prevent manual engine cranking while the vehicle is running thus potentially damaging the vehicles starting system.

The battery power management unit hardware may incorporate a plug-n-play connector system. This may allow for easy installation and serviceability.

The battery power management unit hardware may also incorporate a by-pass harness assembly for ease of removal. This may allow the emergency vehicle to quickly and easily go back to conventionally operation when its in-service use ends. A new inexpensive wiring harness may be all that would be needed to transfer the battery power management unit to a replacement vehicle.

FIG. 1 is an exemplary diagram of an emergency vehicle 100 in accordance with a possible embodiment of the disclosure. The emergency vehicle 100 may be any emergency or official vehicle having emergency or warning lights 120 attached to the chassis 110 that serve to alert others of a potentially dangerous situation, for example. The emergency vehicle 100 may be a police car, fire truck, ambulance, tow truck, road construction vehicle, government vehicle, utility vehicle, etc., for example. The warning lights 120 may be positioned on the roof of the car, in the windows, the front grill, etc., for example, in any manner that may be visible to the public. The hood 130 covers the engine and other components to operate the emergency vehicle 100.

Figure 2:
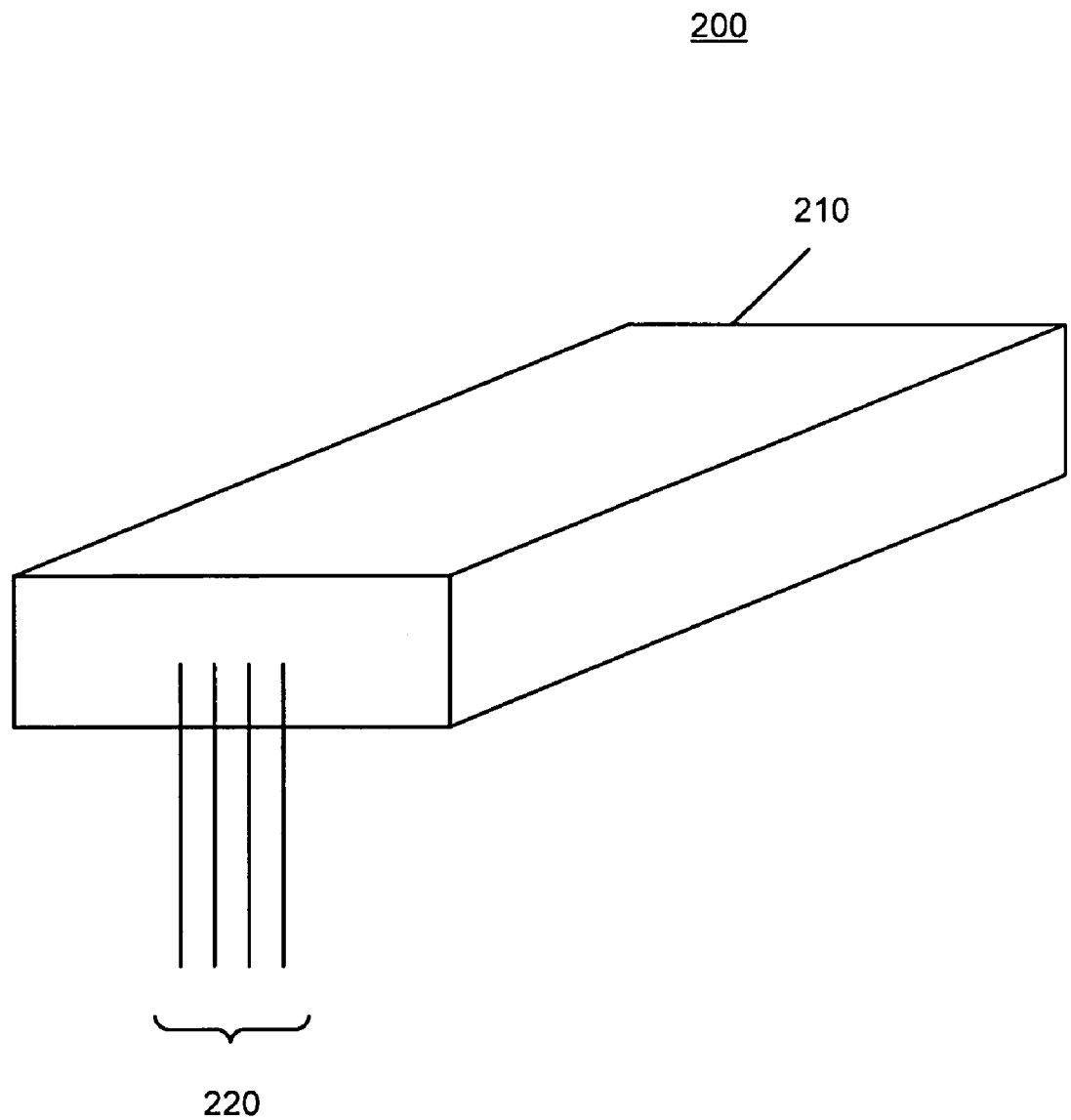
FIG. 2 is a diagram of an exemplary battery power management unit in accordance with a possible embodiment of the disclosure.
Figure 3:
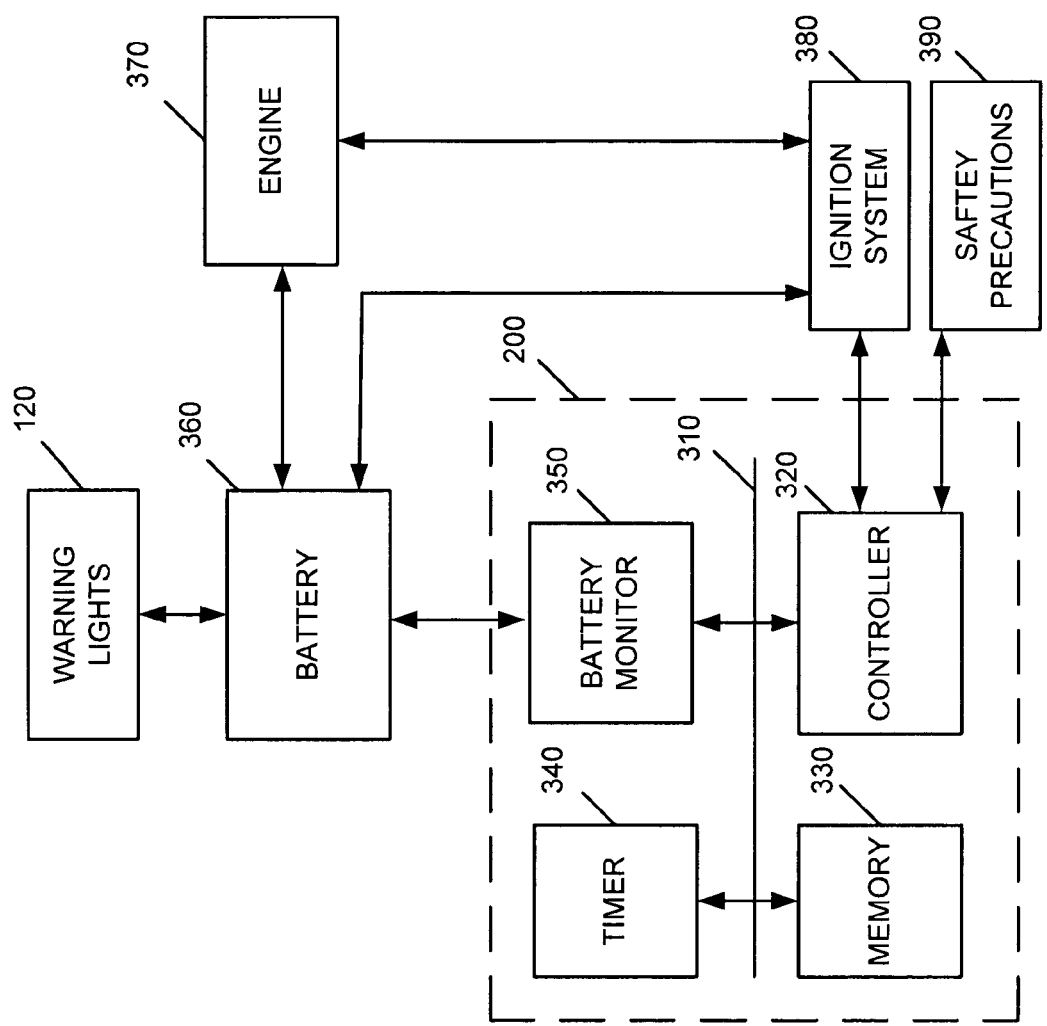
FIG. 3 illustrates an exemplary block diagram illustrating the interaction between the exemplary battery power management unit and various emergency vehicle components in accordance with a possible embodiment of the disclosure.

FIG. 2 is a diagram of an exemplary battery power management unit 200 in accordance with a possible embodiment of the disclosure. The exemplary battery power management unit 200 may include a container 210 for housing the components of the exemplary battery power management unit 200 and a plurality (or harness) of wires 220 for connection to various components of the emergency vehicle 100. The battery power management unit 200 may be located anywhere in the emergency vehicle 100 including under the hood 130, in the passenger compartment, under the dashboard, under a seat, in the trunk, etc., for example. The battery power management unit 200 may be easily removable so that it may be placed in another vehicle, for example FIG. 3 illustrates an exemplary block diagram illustrating the interaction between the exemplary battery power management unit 200 and various emergency vehicle 100 components in accordance with a possible embodiment of the disclosure. The exemplary battery power management unit 200 may include a bus 310, a controller 320, a memory 330, a timer 340, and a battery monitor 350. The exemplary battery power management unit 200 may interact with components of the emergency vehicle 100 that may include warning lights 120, battery 360, engine 370, ignition system 380, and safety precautions 390.

Bus 310 may permit communication among the components of the battery power management unit 200. Controller 320 may include at least one conventional processor or microprocessor, or control logic circuits that interprets and executes instructions. Memory 330 may be a random access memory (RAM) or another type of dynamic storage device that stores information and instructions for execution by controller 320. Memory 330 may also store temporary variables or other intermediate information used during execution of instructions by controller 320 or store static information and instructions for controller 320. Memory 330 may serve to store predetermined thresholds and times used in the disclosed embodiments, for example.

Timer 340 may represent any hardware, software, or control logic timer that may be incremented or decremented, for example. The battery monitor 350 may be any battery monitoring device that may detect and monitor the voltage level of the battery 360 in the emergency vehicle 100. The battery monitor 350 communicates the battery voltage level readings to the controller 320.

The battery 360 may be any vehicle battery or battery system used in an emergency vehicle 100 that powers vehicle systems, including the warning lights 120 and components of the engine 370 and the ignition system 380. The engine 370 represent any engine for powering the emergency vehicle 100, including component for charging the battery 360, including an alternator that is used by the engine 370 to charge the battery 360 as known to those of skill in the art, for example. The ignition system 380 may represent the components of any ignition system that may start (or shut off) the engine 370 of the emergency vehicle 100.

The controller 320 may signal the ignition system 380 to start or stop the engine 370 and resulting charging of the battery 360 upon certain criteria discussed further below. The controller 320 may set one or more safety precaution 390 to prevent at least one of vehicle theft, vehicle damage, and damage to persons. For example, the controller 320 may send a signal to automatically turn off the emergency vehicle's engine 370 if the brake pedal is pressed during the charging of the emergency vehicle's battery 360 in order to prevent theft of the emergency vehicle 100. In addition, the controller 320 may prohibit the emergency vehicle 100 to be started manually during the charging of the emergency vehicle's battery 360. Another safety feature may include the controller 320 (in conjunction with a hood pin switch, for example) may prevent the battery power management unit 200 from operating if the emergency vehicle's hood 130 is open to prevent the engine 370 from starting if being worked on by a mechanic, for example.

The battery power management unit 200 may perform such functions in response to controller 320 by executing sequences of instructions contained in a computer-readable medium, such as, for example, memory 330, a magnetic disk, or an optical disk. Such instructions may be read into memory 330 from another computer-readable medium.

The battery power management unit 200 illustrated in FIGS. 2-3 and the related discussion are intended to provide a brief, general description of a suitable computing environment in which the disclosure may be implemented. Although not required, the disclosure will be described, at least in part, in the general context of computer-executable instructions, such as program modules, being executed by the battery power management unit 200, such as a general purpose computer. Generally, program modules include routine programs, objects, components, data structures, etc. that perform particular tasks or implement particular abstract data types. Moreover, those skilled in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like.

Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

For illustrative purposes, the operation of the battery power management unit 200 and battery power management process will be described below in relation to the block diagrams shown in FIGS. 1-3.

Figure 4:
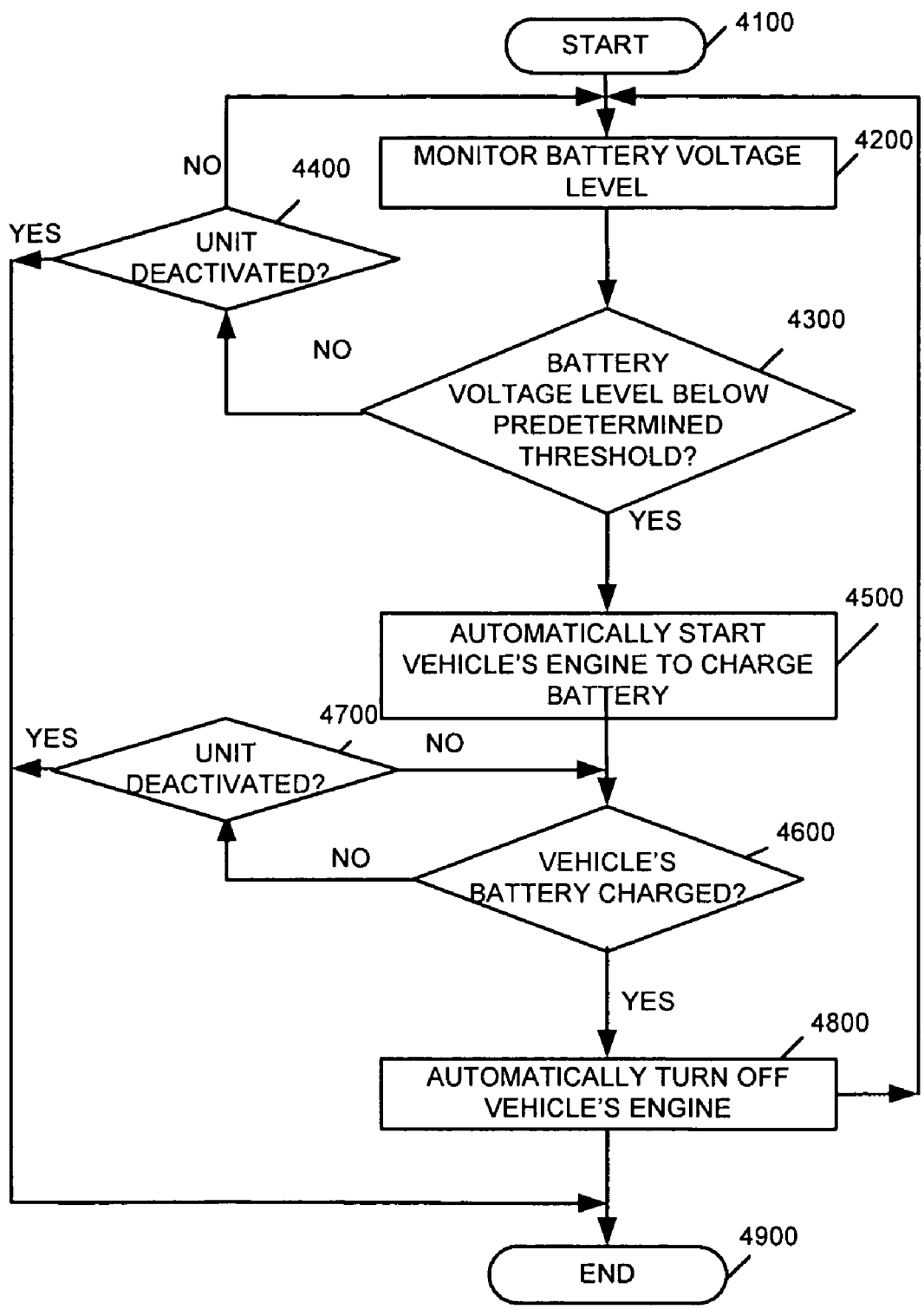
FIG. 4 is an exemplary flowchart illustrating one possible battery power management process in accordance with one possible embodiment of the disclosure.

FIG. 4 is an exemplary flowchart illustrating one possible battery power management process in accordance with one possible embodiment of the disclosure whereby a battery management unit 200 manages battery power in an emergency vehicle 100 having its engine off and warning lights 120 on. The process begins at step 4100 and continues to step 4200 where the battery monitor 350 may monitor the voltage level of the battery 360 of the emergency vehicle 100. At step 4300, the controller 320 may determine if the battery voltage level is below a predetermined threshold.

If the controller 320 determines that the battery voltage level is not below the predetermined threshold, then at step 4400, the controller 320 may determine if the battery management unit 200 has been deactivated. If the controller 320 determines that the battery management unit 200 has been deactivated, the process may go to step 4900 and end. If the controller 320 determines that the battery management unit 200 has not been deactivated, the process may return to step 4200.

If the controller 320 determines that the battery voltage level is below the predetermined threshold, at step 4500 the controller 320 may sends a signal to the emergency vehicle's ignition system 380 to automatically start the emergency vehicle's engine 370 to charge the battery 360. The controller 320 may illuminate a low current indicator light when the engine 370 is charging the battery 360 as a warning, for example.

At step 4600, the controller 320 may determine if the emergency vehicle's battery 360 is charged. The controller 320 may determine that the emergency vehicle's battery 360 is charged by setting a timer 340 to a predetermined time period. The controller 320 may then determine if the timer 340 is expired. If the controller 320 determines that the timer 340 is expired, the controller 320 may automatically turn off the emergency vehicle's engine 370 and the battery monitor 350 may resume monitoring of the battery voltage level. The controller 320 may also change the predetermined time period based on the emergency vehicle's battery 360 specifications.

The controller 320 may also determine that the battery 360 is charged by determining if the battery's voltage level is above a predetermined threshold. If the controller 320 determines that the battery's voltage level is above the predetermined threshold, the controller 320 may automatically turn off the emergency vehicle's engine 370 and the battery monitor 350 may resume monitoring of the battery voltage level.

If at step 4600 the controller 320 determines that the emergency vehicle's battery 360 is not charged, then at step 4700, the controller 320 may determine if the battery management unit 200 has been deactivated. If the controller 320 determines that the battery management unit 200 has been deactivated, the process may go to step 4900 and end. If the controller 320 determines that the battery management unit 200 has not been deactivated, the process may return to step 4600.

If at step 4600, the controller 320 determines that the emergency vehicle's battery 360 is charged, at step 4800, the controller 320 may send a signal to automatically turn off the emergency vehicle's engine 370. The process may then return to step 4200 where the battery monitor 350 may resume monitoring of the battery voltage level.

The controller 320 may determines the time period between automatic starts of the emergency vehicle's engine 370 to charge the battery 360. The controller 320 may then adjust the idle period of the emergency vehicle's engine 370 based on the determined time period.

Embodiments within the scope of the present disclosure may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the disclosure are part of the scope of this disclosure. For example, the principles of the disclosure may be applied to each individual user where each user may individually deploy such a system. This enables each user to utilize the benefits of the disclosure even if any one of the large number of possible applications do not need the functionality described herein. In other words, there may be multiple instances of the components of the disclosed embodiments each processing the content in various possible ways. It does not necessarily need to be one system used by all end users. Accordingly, the appended claims and their legal equivalents should only define the disclosure, rather than any specific examples given.

I claim:

1. A method for battery power management in an emergency vehicle having its engine off and warning lights on, comprising:

monitoring a voltage level of a battery of the emergency vehicle;

determining if the battery voltage level is below a predetermined threshold, wherein if it is determined that the battery voltage level is below the predetermined threshold, automatically starting the emergency vehicle's engine to charge the battery;

determining if the emergency vehicle's battery is charged, wherein if it is determined that the emergency vehicle's battery is charged, automatically turning off the emergency vehicle's engine, wherein the monitoring of the battery voltage level is resumed, determining the time period between automatic starts of the emergency vehicle's engine to charge the battery; and adjusting the idle period of the emergency vehicle's engine based on the determined time period.

2. The method of claim 1, further comprising:

setting one or more safety precaution to prevent at least one of vehicle theft, vehicle damage, and damage to persons.

3. The method of claim 2, wherein at least one of the safety precautions is to automatically turn off the emergency vehicle's engine if the brake pedal is pressed during the charging of the emergency vehicle's battery.

4. The method of claim 2, wherein at least one of the safety precautions is one of preventing the emergency vehicle from being started manually during the charging of the emergency vehicle's battery and preventing the emergency vehicle from being automatically started if the emergency vehicle's hood is open.

5. The method of claim 1, wherein the battery is determined to be charged by:

setting a timer to a predetermined time period;

determining if the timer is expired, wherein if it is determined that the timer is expired, automatically turning off the emergency vehicle's engine, wherein the monitoring of the battery voltage level is resumed.

6. The method of claim 5, further comprising:

changing the predetermined time period based on the emergency vehicle's battery specifications.

7. The method of claim 1, wherein the battery is determined to be charged by:

determining if the battery's voltage level is above a predetermined threshold, wherein if it is determined that the battery's voltage level is above the predetermined threshold, automatically turning off the emergency vehicle's engine, wherein the monitoring of the battery voltage level is resumed.

8. The method of claim 1, further comprising:

illuminating a low current indicator light when the engine is charging the battery.

9. The method of claim 1, wherein the emergency vehicle is one of a police car, a fire truck, an ambulance, a tow truck, a road construction vehicle, a utility vehicle, and a government vehicle.

10. A battery management unit that manages battery power in an emergency vehicle having its engine off and warning lights on, comprising:

a battery monitor that monitors a voltage level of a battery of the emergency vehicle; and a controller that determines if the battery voltage level is below a predetermined threshold, wherein if the controller determines that the battery voltage level is below the predetermined threshold, the controller sends a signal to automatically start the emergency vehicle's engine to charge the battery, determines if the emergency vehicle's battery is charged, wherein if the controller determines that the emergency vehicle's battery is charged, the controller sends a signal to automatically turn off the emergency vehicle's engine, wherein the battery monitor resumes monitoring of the battery voltage level, wherein the controller determines the time period between automatic starts of the emergency vehicle's engine to charge the battery, and adjusts the idle period of the emergency vehicle's engine based on the determined time period.

11. The battery management unit of claim 10, wherein the controller sets one or more safety precaution to prevent at least one of vehicle theft, vehicle damage, and damage to persons.

12. The battery management unit of claim 11, wherein at least one of the safety precautions is to automatically turn off the emergency vehicle's engine if the brake pedal is pressed during the charging of the emergency vehicle's battery.

13. The battery management unit of claim 11, wherein at least one of the safety precautions is one of preventing the emergency vehicle from being started manually during the charging of the emergency vehicle's battery and preventing the emergency vehicle from being automatically started if the emergency vehicle's hood is open.

14. The battery management unit of claim 10, wherein the controller determines that the battery is charged by setting a timer to a predetermined time period, determining if the timer is expired, wherein if the controller determines that the timer is expired, the controller automatically turns off the emergency vehicle's engine and the battery monitor resumes monitoring of the battery voltage level.

15. The battery management unit of claim 14, wherein the controller changes the predetermined time period based on the emergency vehicle's battery specifications.

16. The battery management unit of claim 10, wherein the controller determines that the battery is charged by determining if the battery's voltage level is above a predetermined threshold, wherein the controller determines that the battery's voltage level is above the predetermined threshold, the controller automatically turns off the emergency vehicle's engine and the battery monitor resumes monitoring of the battery voltage level.

17. The battery management unit of claim 10, wherein the controller illuminates a low current indicator light when the engine is charging the battery.

18. The battery management unit of claim 10, wherein the emergency vehicle is one of a police car, a fire truck, an ambulance, a tow truck, a road construction vehicle, utility vehicle, and a government vehicle.

* * * * *